US012808361B2

(12) United States Patent
Manini et al.

(10) Patent No.: US 12,808,361 B2
(45) Date of Patent: Nov. 24, 2026

(54) HIGH-PERFORMANCE GETTER PUMP

(71) Applicant: SAES GETTERS S.P.A., Lainate (IT)

(72) Inventors: Paolo Manini, Milan (IT); Alessandro Ferrara, Giorgio su Legnano (IT); Fabrizio Siviero, Lainate (IT)

(73) Assignee: SAES Getters S.p.A., Lainate (IT)

( * ) Notice: Subject to any disclaimer, the term of this patent is extended or adjusted under 35 U.S.C. 154(b) by 0 days.

(21) Appl. No.: 19/483,709

(22) PCT Filed: Mar. 26, 2025

(86) PCT No.: PCT/EP2025/058282
§ 371 (c)(1),
(2) Date: Nov. 12, 2025

(87) PCT Pub. No.: WO2025/209901
PCT Pub. Date: Oct. 9, 2025

(65) Prior Publication Data

US 2026/0117758 A1 Apr. 30, 2026

(30) Foreign Application Priority Data

Apr. 4, 2024 (IT) ........................ 102024000007444

(51) Int. Cl.
*F04B 37/02* (2006.01)
*F04B 37/04* (2006.01)
*F04B 37/14* (2006.01)
*H01J 7/18* (2006.01)

(52) U.S. Cl.
CPC .............. *F04B 37/02* (2013.01); *F04B 37/04* (2013.01); *F04B 37/14* (2013.01); *H01J 7/18* (2013.01)

(58) Field of Classification Search
CPC .. H01J 7/18; F04B 37/02; F04B 37/04; F04B 37/14; F04B 39/06; F04B 39/121; F04B 37/08; B01J 3/006
See application file for complete search history.

(56) References Cited

U.S. PATENT DOCUMENTS 3,609,062 A * 9/1971 Zucchinelli ............... H01J 7/18
313/558
3,961,897 A * 6/1976 Giorgi ..................... F04B 37/02
422/240

(Continued)

FOREIGN PATENT DOCUMENTS

CA 2374439 A1 12/2000
CN 108757380 A 11/2018

(Continued)

OTHER PUBLICATIONS

International Search Report issued Apr. 22, 2025 in PCT/EP2025/058282, 4 pages.

(Continued)

*Primary Examiner* — Dominick L Plakkoottam
(74) *Attorney, Agent, or Firm* — Element IP, PLC

(57) ABSTRACT

The present invention relates to a getter pump comprising a getter element structured as a monolithic block of getter material (100) having a first getter region (102) and a second getter region (103, 103', **103*n***), with improved characteristics relating to heat and power management, improved efficacy and lesser manufacturing hurdles.

17 Claims, 7 Drawing Sheets

(56) References Cited

U.S. PATENT DOCUMENTS

Figure 2A:
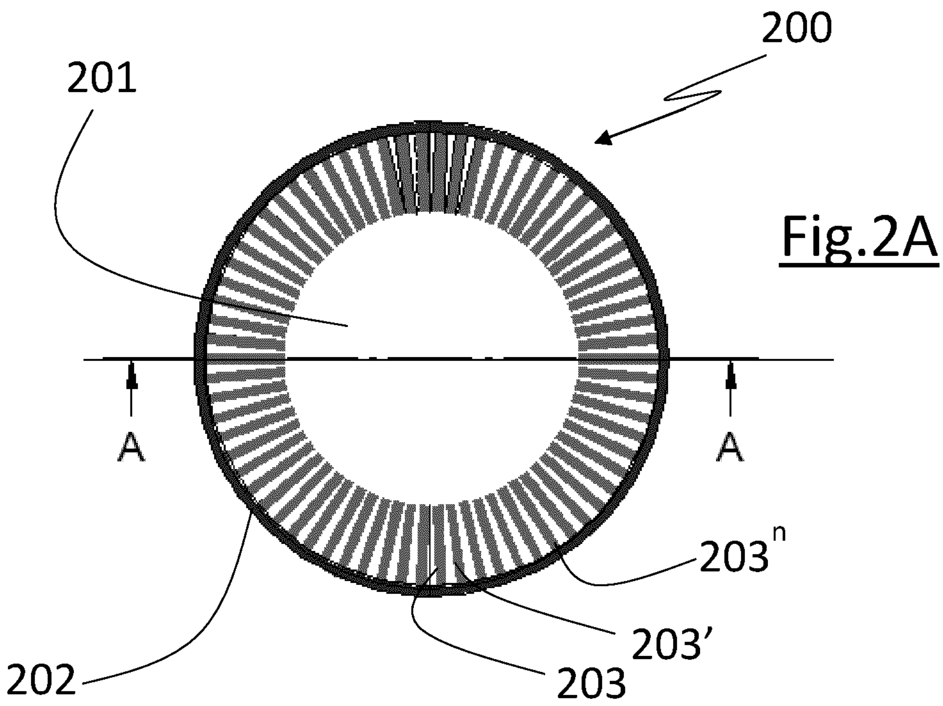

| | | | | | |
|---|---|---|---|---|---|
| 4,137,012 | A * | 1/1979 | della Porta | F04B 37/02 | 417/51 |
| 4,515,528 | A * | 5/1985 | Young | H01J 29/84 | 417/51 |
| 4,534,708 | A * | 8/1985 | Maegdefessel | H01J 7/18 | 417/51 |
| 5,161,955 | A * | 11/1992 | Danielson | H01J 7/18 | 417/51 |
| 5,772,404 | A * | 6/1998 | Carella | F04B 37/02 | 417/313 |
| 5,855,118 | A * | 1/1999 | Lorimer | F04B 37/02 | 62/55.5 |
| 5,972,183 | A * | 10/1999 | Krueger | F04B 37/02 | 118/724 |
| 6,165,328 | A * | 12/2000 | Lorimer | F04B 37/08 | 204/192.12 |
| 6,309,184 | B1 * | 10/2001 | Moraja | F04B 37/02 | 417/205 |
| 8,363,384 | B2 * | 1/2013 | Petersen | H01G 11/20 | 361/503 |
| 2008/0315122 | A1 * | 12/2008 | Katagiri | H01J 37/3056 | 250/492.1 |
| 2011/0014063 | A1 * | 1/2011 | Ferris | H01J 41/00 | 417/49 |
| 2012/0014814 | A1 * | 1/2012 | Bonucci | F04B 37/14 | 417/49 |
| 2016/0069338 | A1 * | 3/2016 | Watanabe | F04B 37/02 | 417/51 |
| 2016/0358741 | A1 | 12/2016 | Schultz et al. | | |
| 2018/0272268 | A1 | 9/2018 | Nguyen et al. | | |
| 2022/0288507 | A1 | 9/2022 | Inomoto et al. | | |
| 2024/0075457 | A1 | 3/2024 | Lanigan-Atkins et al. | | |

FOREIGN PATENT DOCUMENTS

| | | | | |
|---|---|---|---|---|
| CN | 116263147 | A * | 6/2023 | F04B 37/02 |
| DE | 69601746 | T2 | 9/1999 | |
| SU | 646084 | A1 | 2/1979 | |

OTHER PUBLICATIONS

Italian Search Report and Written Opinion issued Aug. 7, 2024 in Patent Application No. IT202400007444, 12 pages.

International Preliminary Report on Patentability issued Sep. 25, 2025 in PCT/EP2025/058282, 25 pages.

* cited by examiner

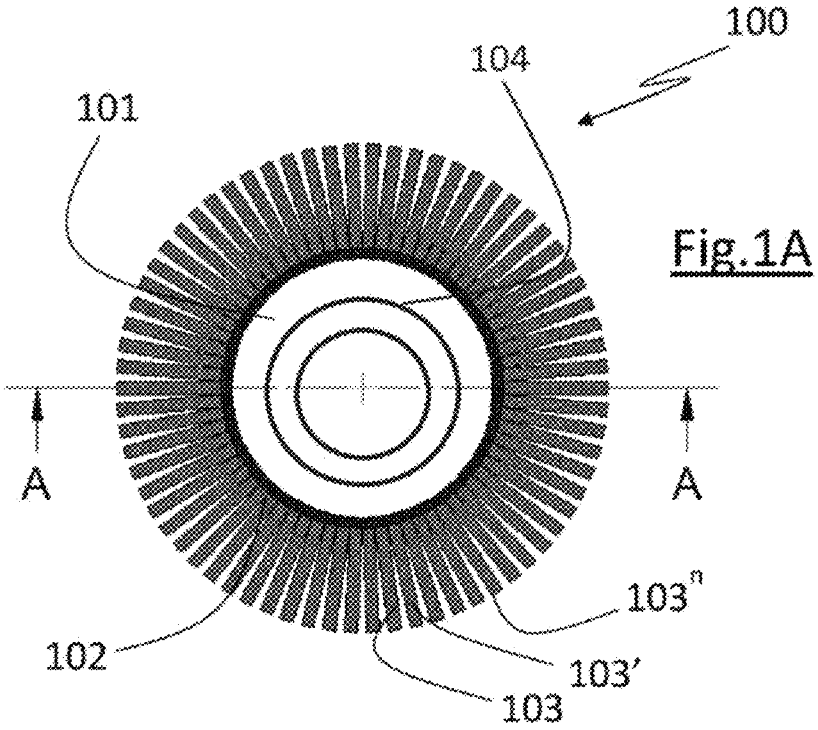
Fig.1A
Fig. 1B
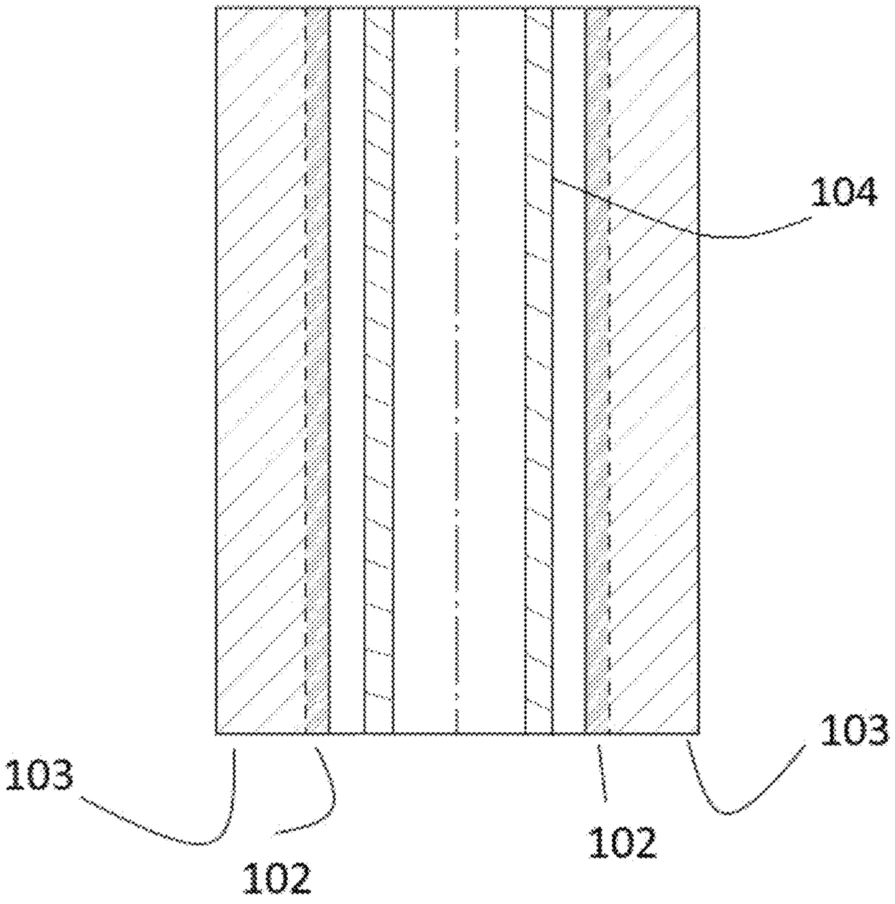

HIGH-PERFORMANCE GETTER PUMP

The present invention is inherent to a getter pump for high-vacuum (HV) or ultra-high-vacuum (UHV) applications with improved characteristics relating to heat and power management, improved efficacy and lesser manufacturing hurdles.

In vacuum technology the use of pumps based on non-evaporable getter material (NEG) is well established, as for example described in U.S. Pat. No. 6,149,392 or the more recent U.S. Pat. No. 9,685,308.

As described in the aforementioned US patents, typically getter pumps rely onto sintered or compressed disks made with a suitable getter material, the disks presenting a central hole, and are mounted onto a central support acting also as heater of the getter disks. U.S. Pat. No. 5,324,172 describes another type of structure with a plurality of separated blades made with getter material connected to a central supporting element. In these getter pumps there is a significant amount of non-getter materials and elements, such as spacers, holders, centering devices, grid elements, etc. adding complexities to the structure of the pump, and rendering the system less efficient in term of overall weight percentage of active material (the getter) on the overall component weight. Moreover, the non-getter components are also a source of outgassing and their reduction is helpful to improve overall pump performances.

SU 646084 disclose a multi-section sorption vacuum pump containing a corrugated body divided into sections by transverse partitions placed inside, secured to a hollow rod, wherein the partitions are hermetically connected to the body and the rod, and in the immediate vicinity of them gas openings are made on the side surface of the rod, covered by spring-loaded pistons installed inside the rod with the possibility of reciprocating movement. The pump pumps out gases with stepwise cooling of the body, which is achieved by successively immersing the pump sections in a coolant, so that when the lower section cools, a vacuum is created in its gas cavity which helps to shift a piston downwards and, accordingly, free the gas openings. As the sorbent becomes saturated and the rate of gas absorption decreases, the pressure on both sides of the piston equalizes so that the piston tends (under the action of the spring) to occupy the initial equilibrium position, ensuring the blocking of the gas openings. When the next section of the pump is cooled, a similar reciprocating movement of the corresponding piston is ensured under the action of gas pressure and the compression force of the spring, and so on from section to section. The sorbent material is activated carbon SKT and the pump achieves just a vacuum of $10^{-4}$ mmHg, while requiring liquid nitrogen cooling of the sorbent and the help of another separate high-vacuum sorption pump. Such a pump provides another example of a complex structure with many non-getter elements.

It is important to underline that, when assembling disks to obtain a getter pump, their surface needs to be exposed in an efficient way in order to have an efficient use of the getter volume/mass.

The above characteristic of getter pumps based on the established getter disks technology poses some limits in achieving the full benefits and advantages of getter technology. First of all, the getter disks need to be spaced between each other in order to have a gas conductance, and they shall be relatively thin, as usually their thickness is comprised between 1 mm and 2 mm. These aspects render the mounting of a getter stack, typically composed by 5-100 parallel getter disks mounted onto a central heater, a delicate operation.

Moreover, the limited contact portion between the getter disk and the heater as well as the intra-disk space, necessary for gas sorption, causes some radiant heat to be transmitted outside the getter pump, unless some heat shielding solutions are adopted, and, needless to say, all this dispersed heat makes the getter pump less energy efficient. Moreover, depending on the disk shape, spacers may need to be used and the void fraction of the disk stack can be 50% or more.

The problem of heat management for getter stacks is also addressed in U.S. Pat. No. 6,109,880 where multiple getter stacks are heated by a single heater and also in U.S. Pat. No. 5,772,404 envisioning the use of a plurality of nested thermally insulating shields. This solution implies the use of high power, as basically only radiant heat is used to reactivate the getter material, and requires the use of heat shields to improve heating efficiency and also to avoid the heating of other components of the vacuum equipment, which may lead to their damage or to an increased surface outgassing.

The above problem is also present in the "blade type" pump described in the aforementioned U.S. Pat. No. 5,324,172.

It is also important to underline that the contact area between the getter disks and the heater, through the getter disks central hole, and between the disks and the spacers, is crucial, since during the mounting phase it may cause frictional damage of the getter disks, and during reactivation it is a possible source of getter disks stress, especially after a certain number of reactivations, and consequently a source of particles of getter material.

With regard to blade getter pumps, the possible problem is instead given by the getter structure itself, as being more prone to release particles if mounted in a non-optimum vacuum system, for example a vacuum system envisioning the use of a not too far away roughing pump, or a cryopump compressor, that with its vibration may have a detrimental effect on the laminar getter structure particles adhesion.

It is to be underlined that particle generation is not an issue in commercially available products from a performance standpoint, but it is a manufacturing constraint and hurdle, and it is also an issue to deal with and properly address in particle-sensitive applications such as those involving semiconductor processes or analytical equipment.

In general, the use of many single getter disks makes the design of the pump very complex. Getter disks have in fact to be piled up in a stack around the heater and several additional mechanical components are needed to keep them in place and ensure overall getter cartridge stiffness and robustness. Finally, the use of getter elements as building blocks of a cartridge poses intrinsic limitations to the final geometry of the getter cartridge itself, which is limited by the very geometry of the single elements.

Even though the getter pump technology is nowadays robust and increasingly appreciated, there is still some room for improving the performances of getter pumps, for example addressing emitted heat management, ageing getter disks particle release, simplification of the manufacturing process and increased flexibility in the shape of the getter cartridge.

The purpose of the present invention is to provide an improved getter pump capable to be easily assembled, minimize particle loss and have an improved thermal management. In a first aspect thereof, the invention consists in a getter pump comprising a getter element structured as a monolithic block of metallic NEG material, said block of NEG material being inscribable in a cylinder, defined as outer circumscribing cylinder, and having a first getter region and a second getter region, characterized in that:

- the monolithic block of getter material presents a central empty region inscribable in a cylinder, defined as inner circumscribing cylinder, having a diameter comprised between 4 mm and 200 mm.
- the first getter region is shaped like a hollow structure having thickness comprised between 1 and 20 mm,
- the second getter region, extends from the first getter region along essentially the whole longitudinal axis (i.e. along at least 90% of the axis) of said central empty region, and comprises between 4 and 100 laminar structures made with getter material.

The term monolithic is intended to encompass structures made or cast as a single piece.

The term "laminar structure" broadly encompasses geometrical structures with one dimension being much smaller than the others, namely structures in which the ratio between the biggest and smallest dimensions (usually the thickness) is equal to or higher than 3, preferably comprised between 3 and 400.

In the present invention, preferred laminar structures are shaped as holed thin disks, i.e. disks having a ratio between the radius and the thickness preferably comprised between 3 and 100.

In an alternate embodiment, the laminar structures are shaped as a polygon, preferably a rectangle.

Laminar structures that are the elements of the second getter region, together with the first getter region, allow to create a monolithic block of getter material with advantageous properties. In particular, mechanical robustness is ensured by the presence of the mass of the first getter region constituting the "bulk" of the monolithic block of getter material, whereas the second getter structure with the getter in the form of laminar elements ensures the presence of a high amount of getter material with no compromise on sorption speed, thanks to the separation of the laminar getter elements.

Preferably, the ratio between the radius of the outer circumscribing cylinder and the radius of the inner circumscribing cylinder of the monolithic getter block is comprised between 2 and 50. This ratio, taking into account the thickness of the first getter region, ensures an optimal balance between encumbrance, capacity and sorption speed of the getter pump.

Figure 2B:
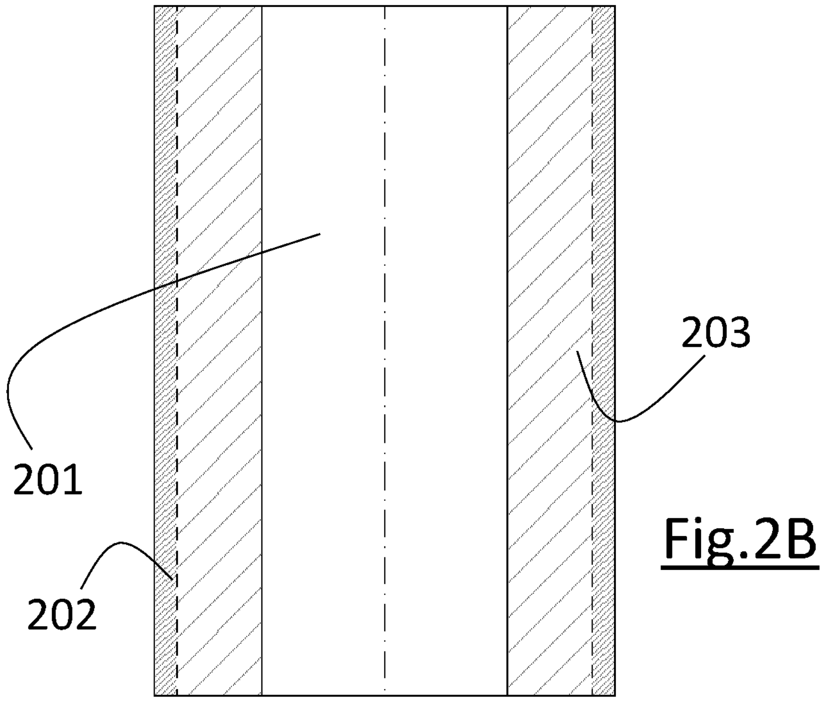
Figure 3A:
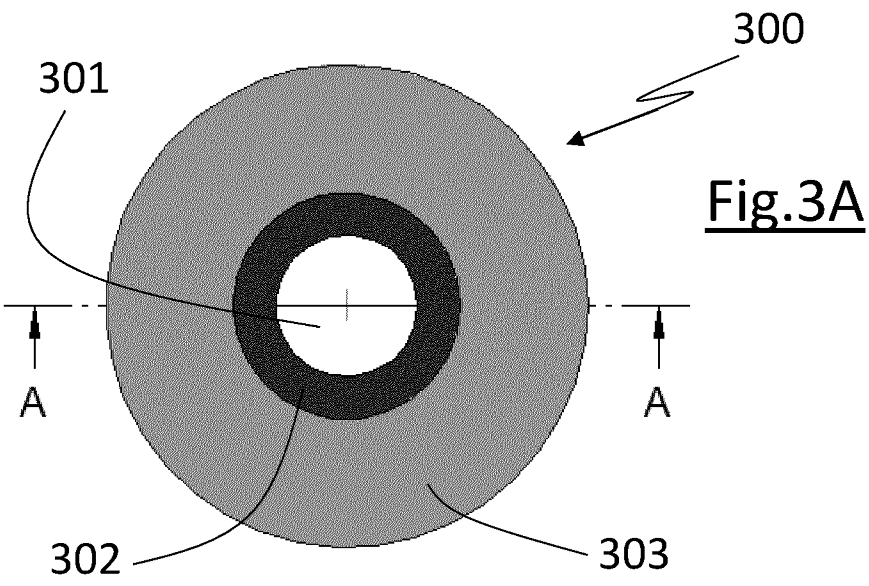
Figure 3B:
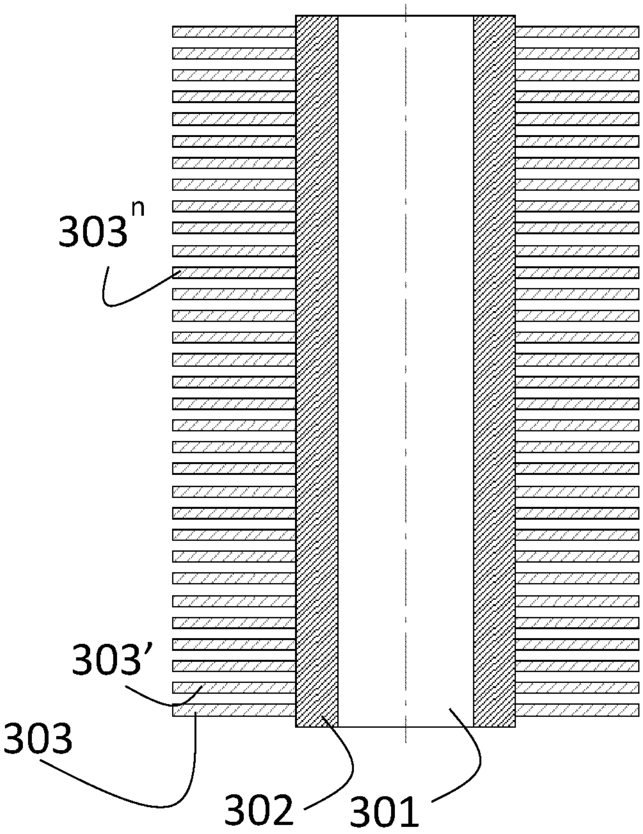
Figure 4A:
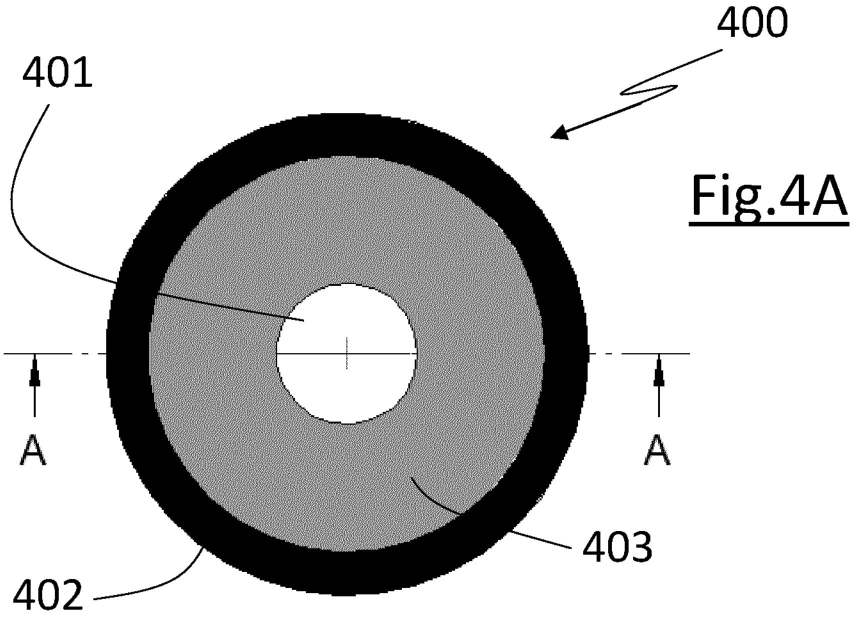
Figure 4B:
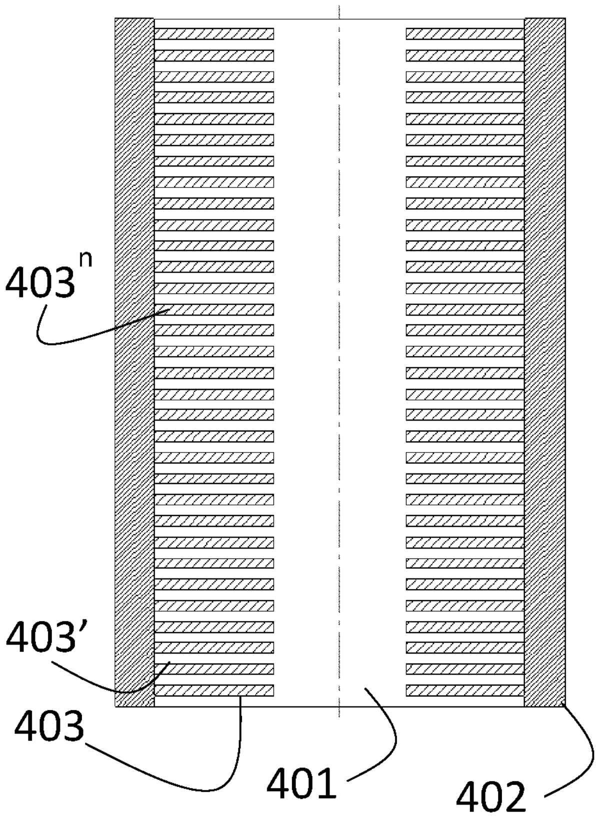
Figure 5:
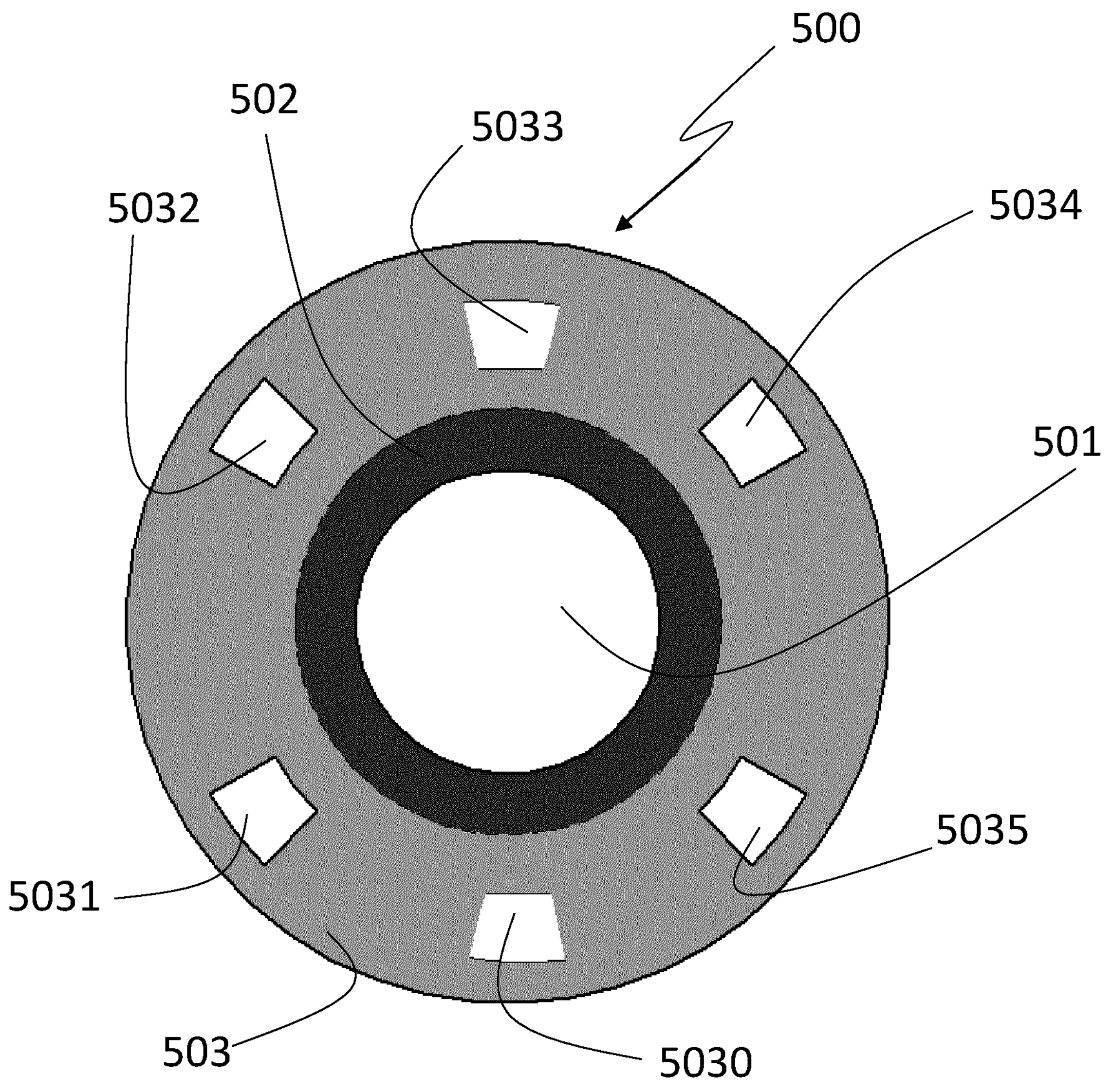
Figure 6:
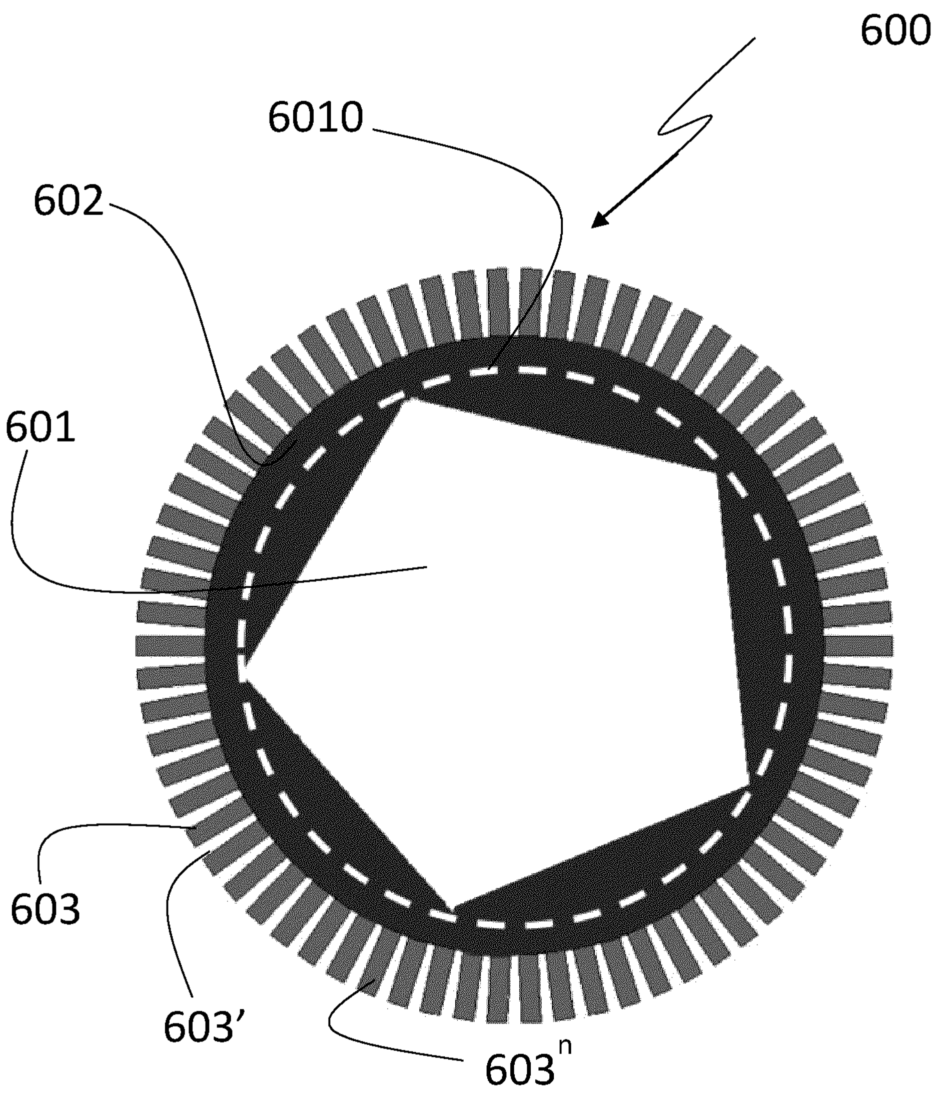
Figure 7:
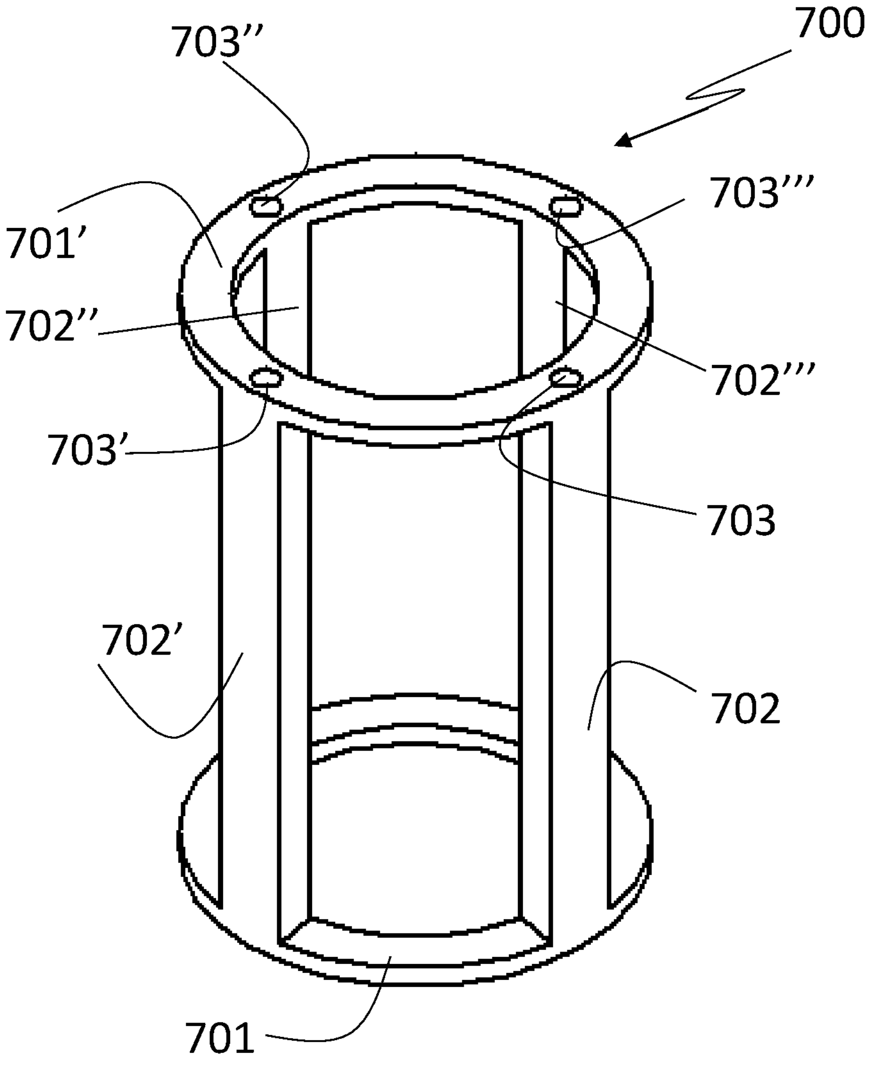

The invention will be illustrated with the aid of the following non-limiting figures where:

FIG. 1A is a view from above of a first embodiment of a monolithic block of getter material according to present invention, while FIG. 1B is its cross-sectional view along line A-A, FIG. 2A is a view from above of a second embodiment of a monolithic block of getter material according to present invention, while FIG. 2B is its cross-sectional view along line A-A, FIG. 3A is a view from above of a third embodiment of a monolithic block of getter material according to present invention, while FIG. 3B is its cross-sectional view along line A-A, FIG. 4A is a view from above of a fourth embodiment of a monolithic block of getter material according to present invention, while FIG. 4B is its cross-sectional view along line A-A, FIG. 5 is a view from above of an alternate version of the third embodiment, FIG. 6 is a view from above of an alternate version of the first embodiment, and FIG. 7 is a perspective view of an optional case for a monolithic block of getter material.

With regard to the above figures, it is to be underlined that, in order to improve their understanding, dimensions and dimensional ratios of certain elements in some cases may have been altered, with particular and nonexclusive reference to spacing of laminar getter structures. Moreover, the figures illustrate the core inventive element of the getter pump of present invention, namely the monolithic block of getter material, as the other elements of getter pumps, such as heaters, thermocouples, etc. are customary and widely known to a person skilled in the art.

As observable in the figures and also specified in their relative following description, it is to be underlined that the difference and boundaries of the first and second getter regions are "virtual" as those regions are part of a monolithic block of material (i.e. a one piece element); such boundaries being determined by the presence of the points on the monolithic block where laminar structures are stemming from the first getter (bulky element) region.

FIG. 1A shows a view from above of a monolithic block of getter material 100 according to a first embodiment of the present invention. The monolithic block of getter material 100 comprises an inner empty cavity 101, having a circular section, surrounded by a first getter region 102 (black element), followed by a second getter region comprising a high number of laminar structures 103, 103', . . . , 103" (grey elements) in the form of flat thin structures.

It is to be underlined that in this and in the following figures, the black and grey elements are only used to distinguish the monolithic block regions and their boundaries, as the material composition is the same.

The cross-sectional view taken along line A-A of the monolithic block of getter material 100 is shown in FIG. 1, in which it is possible to appreciate that preferably the first getter region 102 and the laminar getter structures 103 have the same height.

FIG. 2A shows a view from above of a monolithic block of getter material 200 according to a second embodiment of the present invention.

The monolithic block of getter material 200 comprises an inner empty cavity 201, having a circular section surrounded by a second getter region comprising a high number of laminar structures 203, 203', . . . , 203" (grey elements), followed by a first getter region 102 (black element). FIG. 2B shows the cross-sectional view taken along line A-A of the monolithic block of getter material 200.

The embodiments of FIGS. 1A-1B and 2A-2B show one of the preferred shapes of the getter laminar structures of the present invention, the so-called getter blades, namely planar thin geometrical structures made with getter material, preferably rectangular, preferably disposed with the plane containing the planar structure essentially parallel with the symmetry axis of the central empty region.

In the context of the present invention, the term "essentially" takes into account that physical objects may depart from the ideal condition of a perfect parallelism, and on average, the angle formed by the getter blades/laminar structures with respect to the symmetry axis is preferably equal to or less than 30°.

FIG. 3A shows a view from above of a monolithic block of getter material 300 according to a third embodiment of the present invention. The monolithic block of getter material 300 comprises an inner empty cavity 301, having a circular section, surrounded by a first getter region 302 (black element), followed by a second getter region comprising a high number of laminar structures 303, 303', . . . , 303" (grey elements) in the form of parallel disks.

The cross-sectional view taken along line A-A of the monolithic block of getter material 300 is shown in FIG. 3B, in which it is possible to appreciate the arrangement of the getter disks.

FIG. 4A shows a view from above of a monolithic block of getter material 400 according to a fourth embodiment of the present invention. The monolithic block of getter material 400 comprises an inner empty cavity 401, having a circular section, surrounded by a second getter region comprising a high number of laminar structures 403, 403', . . . , 403'' (grey elements) in the form of parallel disks, followed by a first getter region 402 (black element), being the outermost element of the monolithic block of getter material 400.

The cross-sectional view taken along line A-A of the monolithic block of getter material 400 is shown in FIG. 4B, in which it is possible to appreciate the arrangement of the getter disks.

The embodiments of FIGS. 3A-3B and 4A-4B show another preferred shape of the getter laminar structures, getter disks, namely planar thin holed circular structures made with getter material, preferably disposed with their axis essentially coinciding with the symmetry axis of the central empty region (i.e. the average angle between the two axes is preferably equal to or less than 10°).

It is possible to appreciate that in all of the above embodiments, the first getter region, being of bulk constitution is capable to shield the heater emission.

In a further variant, some holes are present within the laminar structures with the purpose of further improving gas exposure to the getter material. The total area of such holes is less than 50% of the laminar structure surface area, preferably between 5 and 30%. This specific variant is shown in FIG. 5 in the view from above of a monolithic block of getter material 500, having a central empty region 501, in contact with first getter region 502 (black element), adjacent to a second disk-shaped getter region 503 (grey element), presenting six cavities 5030, 5031, 5032, 5033, 5034, 5035.

Number, shapes and disposition of cavities is not relevant nor to be considered limiting as long as the above numerical requirements on the areas are met. Also, while FIG. 5 shows the cavity concept applied to the embodiment of FIGS. 3A-3B, it can be applied to any of the present invention embodiments.

It is to be also underlined that in all the shown embodiments the central cavity cross-section is circular resulting in a circular cylindrical central empty space, but, as shown in FIG. 6, also other cross-sectional shapes such as a polygon are possible as the monolithic block of the present invention is defined on the basis of circumscribing cylinders.

In particular, FIG. 6 is a view from above of a monolithic block 600 comprising a central empty region 601 shaped as a pentagon, whose cross-section is inscribable in an inner circumscribing circle 6010 (dotted white circle) in contact with the first getter region 602 (black element). Said inner circumscribing circle 6010 determines the thickness of the first getter region 602 given by the distance between its boundaries and the boundaries of the second getter region, made by a plurality of laminar elements 603, 603', . . . 603'' (grey elements).

Generally speaking, in the present invention the thickness of the first getter region is essentially uniform and given by the distance between the inner circumscribing cylinder and the second getter region. In less preferred embodiments such as this, in which said distance is not uniform, the requirement of the 1-20 mm thickness is to be met considering the average distance.

The same concept of non-circular cross-sections for some constituting elements of the monolithic block of getter material has been exemplified just once, but can be applied to any of the previously described exemplary embodiments and is the reason for the use of the expression inscribable in a cylinder with regards to the outer circumscribing cylinder and inner circumscribing cylinder.

In a preferred embodiment, the monolithic block of getter material is encased in a metallic open-structure case acting as "cage-rib", to prevent contacts with other components and more in general manual operator contact, and to have an easier handling during the getter pump assembly phase. The metallic skeleton structure, preferably made with stainless steel, also enables an easier coupling of more getter blocks, for example by soldering vertically superimposed cases containing each a getter material block, or through mechanical interlocking of the metallic cases.

Although the present invention is not limited to a specific casing structure, the preferred form is cage-like as shown in FIG. 7, showing a perspective view of an assembled metallic cage 700 having the shape of an empty cylinder with a first base 701 and a second base 701' with its walls defined by four spaced-apart beams 702, 702', 702'', 702'''. On the first base 701 and the second base 701' are present corresponding coupling means 703, 703', 703'', 703''' (only the ones present on the second base 701' being visible in the perspective view) to fix together more cages 700 in order to realize a getter pump comprising more monolithic blocks of getter material. The most common coupling means are pin-cavity locks.

Each of the exemplary embodiments 100, 200, 300, 400, 500, 600 of the monolithic getter blocks according to the present invention may be suitably inserted in the casing structure 700, for example inserting it before the final assembly, i.e. before fixing (by soldering or mechanical locking) one of the bases 701, 701' to the rest of the case structure.

In the getter pump of the present invention, the getter pump heater 104 is preferably inserted in the central empty region cavity. The specific constitution of the heating elements is known to a person skilled in the art; most commonly, the heater 104 comprises a cylindrical ceramic support, usually of diameter comprised between 4 and 50 mm, made with a refractory material, such as alumina or high-temperature machine glass ceramic such as MACOR®, with one or more heating wires wound upon it or passing through the ceramic support from one side to the other. The most common and more useful materials for the heating wires are tantalum, molybdenum or tungsten (pure or alloyed), with a diameter comprised between 0.3 mm and 0.8 mm.

In a preferred embodiment, there is a difference between the heater outside diameter (i.e. also in this case the diameter of the smallest enclosing cylinder) and the inner circumscribing cylinder diameter such that their ratio is usefully comprised between 0.1 and 1, with 1 representing therefore a fitting heater essentially in contact with the getter block structure. To have a good thermal management, the active height of the heater, namely the height of the heater presenting the heating element (such as the heating wires), is comprised between 0.8 and 1.0 times the height of the monolithic block of getter material, wherein the term height of the monolithic block of getter material is to be intended to be the sum of the heights of the monolithic blocks of getter material in case the getter pump according to present invention comprises multiple stacked getter elements each structured as a monolithic block of getter material. Preferably, the number of monolithic blocks of getter material in a getter pump according to present invention is comprised between 1 and 10.

Thanks to the shape of the monolithic block of getter material, the first getter region acts as a heat and radiation shielding element toward the external environment, avoiding heating of external elements and at the same time maximizing heater power management efficiency.

As per description of the invention and of the exemplary figures, there are two main embodiments encompassed in the present invention: in the first case the first getter region is interposed between the central empty region and the second getter region, in the other one it is the second getter region that is interposed between the central empty region and the first getter region.

The configurations having the second getter region as outer element (excluding the optional encasing element), such as the ones shown in FIGS. 1 and 3, are preferred when the pump is directly exposed to the vacuum system chamber mounting the getter pump, whereas the other main embodiment, i.e. the first getter region as outer element as shown in FIGS. 2 and 4, is preferably employed when the getter pump is coupled to the vacuum system through a conductance such as a connecting vacuum flange.

Even though the production method of the monolithic blocks of getter material is not limited to a specific manufacturing technique, one of the most advantageous methods in terms of efficiency and precision in the manufactured shape, is the so-called additive manufacturing.

Additive manufacturing of metals powders or alloys is finding increasing acceptance in the market as a way to consolidate powders into objects of complex shape. It has therefore the potential to solve some of the issues of the known art.

Additive manufacturing, also known as 3D-printing, is a technique that is attracting interest for making metallic objects of complex shapes, such as described in US 2018/0318922, and/or to impart desired physical properties to metallic finished or semi-finished products, such as described in WO2021/208651 and JP2022/110396, that focus on titanium alloys. All these documents focus in improving the strength characteristics of the device but do not focus onto other properties that instead are appreciated in different technical fields, such as in vacuum technology.

The present invention is not limited to specific chemical compositions of the metallic NEG material, and those are known to a person skilled in the art, as for example described in U.S. Pat. Nos. 8,961,816, 9,416,435, and 6,521,014. More in general, any NEG material having Titanium or Zirconium as most abundant element can advantageously be used.

The invention claimed is:

1. A getter pump for high-vacuum and ultra-high-vacuum applications comprising at least one getter element structured as a monolithic block of metallic non-evaporable getter material which is inscribable in an outer circumscribing cylinder, and having a first getter region and a second getter region, characterized in that:

the monolithic block of getter material presents a central empty region inscribable in an inner circumscribing cylinder having a diameter comprised between 4 mm and 200 mm, a heater is installed in said central empty region, said first getter region is shaped like a hollow structure having thickness comprised between 1 mm and 20 mm and is of bulk constitution that is capable to shield the emission of said heater, said second getter region extends from the first getter region along at least 90% of the longitudinal axis of said central empty region, and comprises between 4 and 100 laminar structures.

2. A getter pump according to claim 1, wherein the ratio between the radius of the outer circumscribing cylinder and the radius of the inner circumscribing cylinder is comprised between 2 and 50.

3. A getter pump according to claim 1, wherein the laminar structures each have a ratio between the smallest dimension and the largest dimension comprised between 3 and 400.

4. A getter pump according to claim 1, wherein the central empty region is shaped as a cylinder.

5. A getter pump according to claim 4, wherein the cross-section of the central empty region is shaped as a circle or a polygon.

6. A getter pump according to claim 1, wherein the second getter region is interposed between the central empty region and the first getter region.

7. A getter pump according to claim 1, wherein the first getter region is interposed between the central empty region and the second getter region.

8. A getter pump according to claim 1, wherein the ratio between the height of the heater and the height of the monolithic block of getter material is comprised between 0.8 and 1.

9. A getter pump according to claim 1, wherein one or more of the laminar structures of the second getter region present some holes.

10. A getter pump according to claim 1, wherein the laminar structures are shaped as disks.

11. A getter pump according to claim 10, wherein the axis of the disk-shaped laminar structures is essentially parallel to the inner circumscribing cylinder axis.

12. A getter pump according to claim 1, wherein the laminar structures are shaped as blades.

13. A getter pump according to claim 12, wherein the planes of the blades are essentially parallel to the inner circumscribing cylinder axis.

14. A getter pump according to claim 1, wherein the at least one getter element comprises a number of monolithic blocks of getter material that is comprised between 1 and 10.

15. A getter pump according to claim 1, wherein the monolithic block of getter material is contained in an open-structure case.

16. A getter pump according to claim 15, wherein the open-structure case comprises corresponding coupling means for coupling with other open-structure cases in a stacked configuration.

17. A getter pump according to claim 1, wherein the getter material comprises Titanium or Zirconium as the most abundant element.

* * * * *